United States Patent
Lyons, Sr.

[15] 3,654,376
[45] Apr. 4, 1972

[54] PRESSURE MEANS FOR USE WITH EYEGLASS FRAMES

[72] Inventor: Thomas J. Lyons, Sr., 152 Home St., Pittsburgh, Pa. 15201

[22] Filed: Apr. 15, 1969

[21] Appl. No.: 816,220

[52] U.S. Cl............................................351/113, 351/121
[51] Int. Cl............................................................G02c 5/16
[58] Field of Search..........................351/113, 114, 121, 123

[56] References Cited

UNITED STATES PATENTS 2,550,348   4/1951   Hansen...............................351/140 X
2,087,502   7/1937   Chylack..................................351/113
2,858,539   11/1958  Carlson........................................2/13

Primary Examiner—David Schonberg
Assistant Examiner—John W. Leonard
Attorney—Don J. Smith

[57] ABSTRACT

Pressure means for use with eyeglass frames, including a main support body which snugly fits over the temple portion of the frame, and an elongated spring member held by the support body and shaped to engage the end piece of the frame front when the temple is substantially fully open such that the spring is placed in tension and a pressure is exerted on the temple to urge it towards its closed position.

6 Claims, 5 Drawing Figures

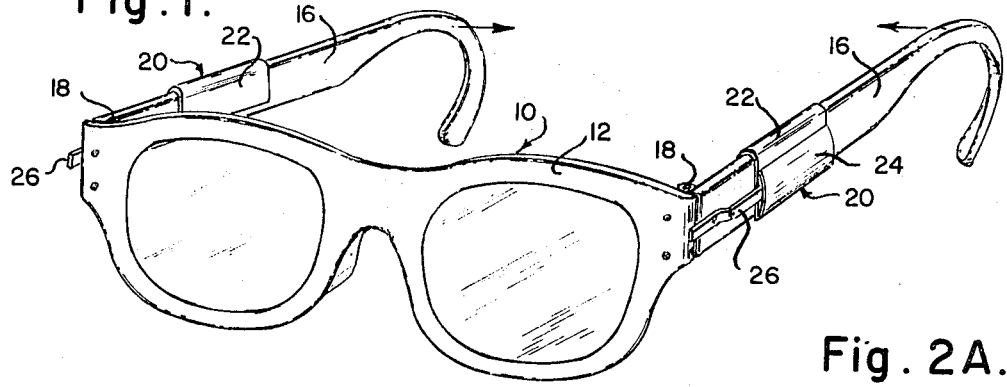
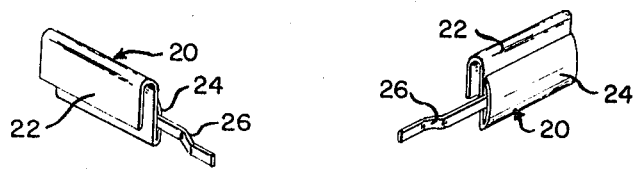
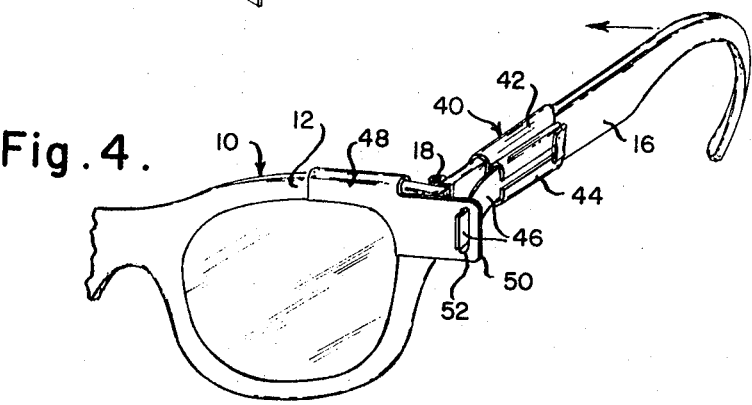
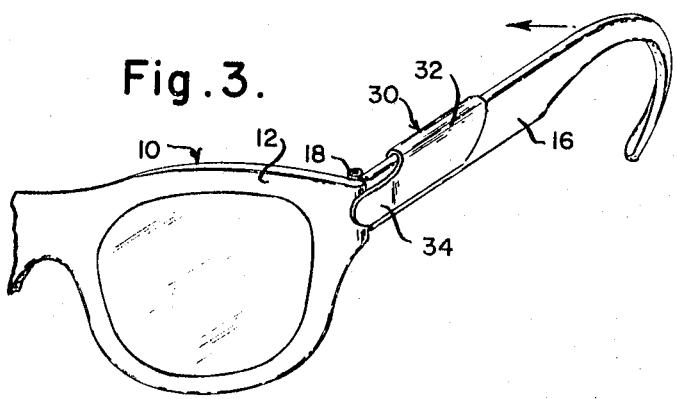
INVENTOR
Thomas J. Lyons, Sr.

PRESSURE MEANS FOR USE WITH EYEGLASS FRAMES

This invention relates to a device for use with eyeglass frames to maintain the frames securely on the heads of the users.

A common annoyance with ordinary eyeglass frames is that, after a prolonged period of use, the frames slip part way along the nose of the user. This is caused by a bowing of the temples away from the head or spreading of the temples because of loosening of the screws holding the hinge between the temples and the frame front. The temples may be reshaped and the hinge screw tightened in order to restore the proper holding power of the frames. But, it will be a matter of a short wearing period when the temples will again bow or the hinge screw loosen and the frames will again slip down the nose of the user.

Attempts have been made to correct the slipping problem of eyeglass frames. These attempts involve pressure means for exerting a pressure on the temples of the frame so as to urge the temples onto the head of the user to thereby maintain the frames in their proper position at all times. The pressure means used heretofore are made integral with the frames as typified by the means disclosed in U.S. Pat. Nos. 2,550,348 and 3,001,200. The integral pressure means are most often made in conjunction with the frames themselves; that is, the pressure means and frames are assembled together in the first instance and the user purchases the combination. The integral pressure means are not readily adaptable to existing frames and, accordingly, the user must buy new frames if he chooses to have frames which will stay in proper position on his head. I overcome the drawback of integral pressure means, while at the same time retaining the positive features thereof, by providing pressure means which are separate from the frames themselves and can be simply mounted on the temples without any need for permanent attachment. The pressure means of my invention can be placed on or taken off the temples at will without any need for using tools of any sort. More specifically, I provide, preferably, pressure means for use in combination with eyeglass frames including a frame front, a pair of temples, and hinge means connecting the temples to the frame front, the pressure means comprising: a resilient main body member shaped to snugly and removably fit over the temple and surrounding at least a part thereof; and an elongated resilient means supported by said main body member and extending forwardly thereof, the resilient means being shaped to engage the endpiece portion of the frame front only when the temple is substantially in the fully open position such that a pressure is exerted on the temple urging the temple toward its closed position. Other details and advantages of the invention will become apparent as the following description of certain present preferred embodiments thereof proceeds.

In the accompanying drawings I have shown certain present preferred embodiments of the invention in which:

FIG. 1 is a perspective view of an eyeglass frame showing the pressure means of this invention mounted on the temples of the frame with the temples in the open position and the pressure means exerting a pressure on the temples urging them towards the closed position;

FIGS. 2 and 2a are a perspective view of the pressure means of FIG. 1 shown separated from the eyeglass frame;

FIG. 3 is a perspective view of part of an eyeglass frame showing another embodiment of the pressure means of this invention; and FIG. 4 is a perspective view of part of an eyeglass frame showing still another embodiment of the pressure means of this invention.

Referring now to the drawings, and particularly to FIGS. 1 and 2, 10 generally designates an eyeglass frame of well-known construction, including a frame front 12 and a pair of temples 16 suitably attached with the frame front by hinge means 18 of any well-known design. In their open positions (FIGS. 1, 3, 4) the temples 16 are disposed substantially normally of the frame front 12, as determined by stops surfaces thereof formed adjacent each hinge 18. The pressure means of this invention, as shown in FIGS. 1 and 2, is generally designated 20, and as shown in FIG. 1 is attached to each temple 16. Each pressure means 20 includes an elongated main body member 22 formed from any suitable metallic or non-metallic resilient material. Main body member 22 has a generally U-shaped configuration suitably sized so that the main body member fits snugly, yet removably, over a forward portion of the temple 16. By fitting "removably" on temple 16, I mean that the pressure means 20 can be easily detached from the temple 16 by hand without the necessity of using any tools. In addition, the size of the pressure means 20 is such that it snugly or firmly grips the temple 16 so as not to slide freely along the length of the temple, unless sufficient hand force is applied. The outer portion 24 of the main body member 22 is folded toward the bight of the U-shape thereof, and is suitably arranged with respect to the remainder of the main body member for snugly receiving an elongated resilient flat spring member 26. Spring member 26 is disposed to extend forwardly of main body member 22 towards the endpiece of the frame front 12. The forward end portion of spring member 26 is suitably shaped to curve towards the center of frame front 12 such that the spring member engages the outer surface of the endpiece of the frame front when the temple 16 is substantially in the fully open position. In addition, the shape of spring member 26 is such that the engagement just described results in the spring member being placed under tension to thereby exert a pressure on the temple 16 to urge it towards its closed position. The pressure so exerted is sufficient to cause the temples 16 to securely grip the head of the user so that the frame 10 will remain in proper position at all times. In addition, the pressure on the temple 16 is not so great as to cause discomfort to the user. The degree of pressure exerted by spring member 26 can be simply adjusted either by suitably positioning the entire pressure means 20 on the temple 16 (e.g. moving the pressure means away from the hinge means 18 would increase the pressure with the spring member 26 having the shape shown in FIGS. 1 and 2) or by leaving main body member 22 in one position and sliding the spring member one way or the other as desired. The shape of the spring member 26 is also made so that the temple 16 may be closed or opened without the spring member interfering with the movement of the temple relative to the frame front.

Another embodiment of the pressure means of the present invention is shown in FIG. 3, and is generally designated 30. Pressure means 30 has an integral elongated U-shaped main body 32 and spring member 34, formed from any suitable metallic or non-metallic resilient material. The shape considerations given to the elements forming the pressure means 20 of FIGS. 1 and 2 are similarly given to those of pressure means 30. That is, main body 32 is shaped to fit snugly, yet removably, over the temple 16 while spring member 34 is shaped to engage the endpiece of the frame front 12 when the temple 16 is substantially fully opened such that a pressure is exerted on the temple urging it toward the closed position, the pressure being sufficient to cause the temples to securely grip the head of the user while not being so great to cause discomfort.

Yet another embodiment of the pressure means of this invention is shown in FIG. 4 and is generally designated 40. Pressure means 40 includes an elongated main body member 42 formed from any suitable resilient metallic or non-metallic material, and having a generally U-shape suitable for snugly, yet removably, fitting over a forward portion of temple 16. The outer portion 44 of main body member 42 has opposite folds formed to define an open ended channel for slidably receiving a flat spring member 46. The rear end of spring member 46 is suitably bent over to serve as a stop for the forward movement thereof. Pressure means 40 also includes a sort of saddle-shaped receiver member 48 suitably formed and contoured, as shown in FIG. 4, to snugly, yet removably, fit over the end portion of the frame front without obstructing the eyeglass lens. Receiver member 48 has an end portion 50 extending beyond the endpiece of frame front 12 and having a slot 52 formed therethrough. Slot 52 is suitably sized to snugly receive the free end portion of spring member 46 in the manner shown in FIG. 4. The end portion 50 extends beyond the endpiece of the frame front 12 a sufficient amount such that spring member 46 is made to bend away from the temple 16 resulting in the spring member being placed in tension to thereby exert a pressure on the temple 16 urging it towards its closed position. Thus, the temples 16 will securely grip the head of the user so that the frame will stay in position at all times. The length of end portion 50 and spring characteristics of spring member 46 are suitably selected to regulate the degree of pressure needed to exert the proper holding force on the temples 16 while avoiding undue discomfort to the user. The degree of pressure can also be simply varied by positioning the main body member 42 on the temple 16 as desired.

It is noted that the resilient means of the pressure means of this invention (i.e. the spring members 26 and 34 of pressure means 20 and 30, respectively, and spring member 46 and receiver member 48 of pressure means 40) engage the endpiece of the frame front 12 when the temples 16 are "substantially in the fully open position". The resilient means will engage the endpieces actually before the temples are completely fully opened but the engagement will occur considerably more towards the open position of the temples than towards the closed position. It is for sake of clarity of expression that I say that the engagement occurs when the temples are substantially in the fully open position. The expression should not be construed as meaning that the engagement occurs at complete full opening of the temples, but rather as somewhere near the fully open position.

While I have shown and described certain present preferred embodiments of the invention, it is to be distinctly understood that the invention is not limited thereto but may be otherwise variously embodied within the scope of the following claims.

I claim:

1. Pressure means for an eyeglass frame including a frame front, a pair of temples, and hinge means connecting said temples to said frame front, said pressure means comprising a main body member shaped to fit snugly and removably over one of said temples at a position adjacent the associated one of said hinge means, a receiver member shaped to fit snugly and removably over said frame front at a position adjacent said associated hinge means, said receiver member extending outwardly beyond and in avoidance of said one temple and said associated hinge means, and elongated resilient means supported on said main body member and extending forwardly thereof, said resilient means being disposed to bearingly engage an outer end portion of said receiver member only when said one temple is near its fully opened position substantially normally of said frame front to urge said one temple from its fully opened position toward its closed position and into bearing contact with the user's head.

2. The pressure means as set forth in claim 1 wherein said body member and said resilient means are selectively longitudinally movable with respect to each other and said resilient means is shaped such that said selective longitudinal movement varies the pressure exerted by said resilient means on the temple.

3. The combination according to claim 1 wherein said main body member and said receiver member are resilient and are shaped for spring loaded engagement with said one temple and said frame front respectively.

4. The combination according to claim 1 including said outer end portion having a slot therein, said elongated resilient means being shaped to fit into said slot adjacent said open position.

5. The combination according to claim 1 wherein a second receiver member and a second main body member are similarly disposed on said frame front and on the other of said temples respectively, and second resilient means are supported on said second main body member for similar bearing contact with an outer end portion of said second receiver member.

6. The combination according to claim 5 wherein each of said end portions has a slot therein, and each of said resilient means are shaped to fit into the slot of the associated receiver end portion adjacent the open position of the associated temple.

* * * * *